Oct. 4, 1932.  W. P. OSGOOD  1,881,414
SEAM PRESSING MACHINE
Filed April 23, 1930  6 Sheets-Sheet 1

Fig.1.

Inventor
Walter P. Osgood
by Charles W. McDermott
his Attorney

Oct. 4, 1932.  W. P. OSGOOD  1,881,414
SEAM PRESSING MACHINE
Filed April 23, 1930   6 Sheets-Sheet 6

Inventor
Walter P. Osgood
By Charles W. McDermott
his Attorney

Patented Oct. 4, 1932

1,881,414

UNITED STATES PATENT OFFICE

WALTER P. OSGOOD, OF MALDEN, MASSACHUSETTS, ASSIGNOR TO BOSTON MACHINE WORKS COMPANY, OF LYNN, MASSACHUSETTS, A CORPORATION OF MASSACHUSETTS

SEAM PRESSING MACHINE

Application filed April 23, 1930. Serial No. 446,502.

The present invention relates to seam pressing machines which are used in the manufacture of boots and shoes to flatten the seams in shoe uppers.

In seam pressing machines, as constructed heretofore, means have been provided for flattening the seam through its subjection to pressure, or to the action of rubbing or beating tools, applied progressively along the length of the seam. Accordingly, it has been necessary to provide such seam pressing machines with means for relatively feeding the seam and the flattening instrumentality in order to transfer the point of operation of said instrumentality along the seam.

One object of the present invention is to produce a seam pressing machine which will press the seam at a single stroke.

To the accomplishment of this object, a feature of the present invention contemplates the provision, in a seam pressing machine a jaw for directly supporting similar articulated parts of a shoe upper in different planes, respectively, and a cooperating jaw acting directly on the opposite side of said articulated parts, of automatic means for closing said jaws with heavy pressure to cause said articulated parts to be consolidated into a single plane.

In the broader aspects of the invention this feature may be used to advantage in flattening the ridge of the back seam, the seam through which the vamp, quarter and lining are secured together, the longitudinal seam connecting the parts of the lining beneath the vamp, or in fact, any seam forming a part of a made shoe upper. By a seam is meant a joint made by the overlapping of the shoe upper parts irrespective of the means for securing the overlapped parts together. Such a joint usually comprises stitches, but it may include an adhesive. For purposes of disclosure the seam flattened by the illustrated embodiment of the present invention is that formed by overlapping the two parts of a textile lining which extends in the made shoe upper longitudinally beneath the vamp. This longitudinal seam may, and usually does, comprise stitches, but the overlapping parts of the lining may be secured together by an adhesive applied to the contacting faces of the overlapped parts or by the sizing material, such for instance, as starch, incorporated in the yarns for the textile lining or applied to the textile lining after it has been woven. But whether the seam, formed by overlapping the parts of the lining, is united by stitches or an adhesive, it leaves a ridge in the finished shoe to cause discomfort.

Accordingly, another feature of the present invention contemplates the provision, in a seam pressing machine a jaw for supporting the pieces of a pieced lining articulated by a longitudinal seam, and a cooperating jaw acting directly on the opposite side of the lining, of automatic means for closing said jaws with heavy pressure to cause said pieces to be consolidated at the seam into a single plane.

Broadly considered the seam pressing machine may be provided with any suitable means for subjecting the longitudinal seam in the lining, either before or after its incorporation in a made shoe upper, to direct pressure. Preferably, the machine is provided with a supporting member constructed to support a two-piece lining in a made upper with one piece flat and the other overlapping the flat piece adjacent the longitudinal seam thereof and with a pressing member constructed to extend between the supported lining and the vamp and press both pieces into the same flat condition. The work supporting member and the pressing member may be jaws, preferably narrow faced, adapted to press the seam between them.

Another object of the present invention is to produce a seam pressing machine which will perform the seam pressing operation automatically.

To the accomplishment of this object another feature of the present invention contemplates the provision, in a seam pressing machine having cooperating anvil jaws for pressing the seam, of mechanism connected to one of said jaws acting automatically and continuously to bring the members into a position of pressure, to hold them in such position and thereafter to return them to a position of clearance.

In its broader aspect this feature of the invention may be incorporated in a machine provided with a single set of seam pressing members which may be relatively actuated to start from a position of clearance, move to a position of pressure, return to a position of clearance and then stop to afford the operative ample time to withdraw the flattened seam from between the jaws and to insert an unflattened seam between them before restarting the machine to complete another cycle of operations. It is preferred, however, to provide the seam pressing machine with two work supporting jaws and two cooperating pressing jaws arranged to act alternately, continuously and repeatedly in pressing seams supported one at a time upon the work supporting jaws, the arrangement being such that while one pressing jaw is in a position of clearance the other pressing jaw is in a position of pressure. By this arrangement the operative is enabled to remove the seam previously acted upon from one work supporting jaw and place another made upper thereon while the seam of the other made upper is being pressed, thereby effecting a considerable saving of time. The pressing members are constantly connected to a common continuously operated actuating mechanism so that the sole duty of the operative may be the removal of the flattened seam from, and the insertion of an unflattened seam between, the jaws each time the jaws are brought into the position of clearance. With this construction the operative is obliged to keep pace with the machine in placing the unflattened seams between the jaws and removing the flattened seams therefrom whereby the machine can be operated at a speed adjusted to the speed of the operative and a maximum amount of work produced.

Another object of the present invention is to produce a seam pressing machine in which the flattened seam is withdrawn from between the jaws automatically thus to reduce the time in which the jaws are held in a position of clearance to the brief time necessary for the operative to insert an unflattened seam between the jaws thereby to further increase the machine's output.

Other features of the present invention consist in certain devices, combinations and arrangements of parts hereinafter described, and then pointed out broadly and in detail in the appended claims, possessing advantages readily apparent to those skilled in the art.

The various features of the present invention will be readily understood from an inspection of the accompanying drawings illustrating the best form of the invention at present known to the inventor, in which.

Figures 8, 9, 10, 11:
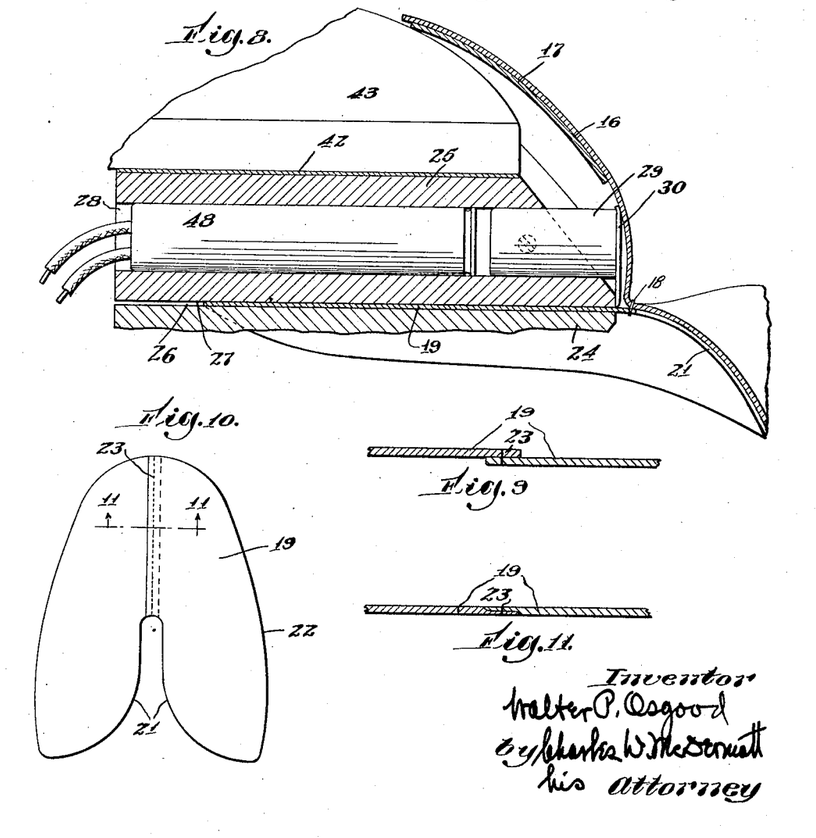
Fig. 8 (sheet 6) is an enlarged detail view in sectional elevation on the line 8—8, Fig. 2.
Fig. 9 is a diagrammatic view in sectional elevation showing the parts of a lining for a shoe upper articulated by a lapped and sewed seam.
Fig. 10 is a detail view in plan showing how the ridged seam, illustrated in Fig. 9, has been flattened by the machine embodying the features of the present invention.
Fig. 11 is a diagrammatic view in sectional elevation on the line 11—11, Fig. 10.

In the shoe industry, the made upper, ready for the shoe assembling and bottoming operations, comprises a vamp 16 (Fig. 8) having a box blank 17 secured thereto and a lining 19 secured to the throat of the vamp at the seam 18 and to the front edges of the quarters 20 (Fig. 1) which are joined by a back seam (not shown). Generally, the lining 19 has a throat 21 (Fig. 10) and a peripheral edge 22 shaped similarly to the throat and peripheral edge of the vamp, respectively. The throats of the vamp 16 and the lining 19 are secured together in such a manner as to leave their peripheral edges free. As shown in Fig. 10 the lining 19 is composed of two parts of woven textile material, usually cotton duck. These two lining parts are secured together by overlapping the two straight edges of the lining and by stitching through the marginal portions of the overlapped edges. As shown in Fig. 9 this manner of articulating the two lining parts forms a ridged seam 23 extending longitudinally beneath the vamp 16.

In order to flatten out this longitudinal seam 23 in the manner illustrated in Figs. 10 and 11, the illustrated embodiment of the invention is provided with anvil jaws 24 (Fig. 2) and pressing jaws 25. In the drawings two anvil jaws and two pressing jaws are shown, but it should be understood that any desired number of anvil jaws and pressure jaws may be employed. Each of the anvil jaws 24 is provided with a smooth narrow flat face 26 (Fig. 8) which engages the bottom of the seam 23. Each of the pressing jaws 25 is provided with a smooth flat face 27 which engages the top of the seam 23.

The lining 19 is inserted between a cooperating pair of the anvil and pressure jaws so that when they are brought into a position of pressure the seam 23 will be pressed out flat. When the lining is inserted between the jaws 24 and 25 the vamp 17 is bent upwardly (Fig. 8) to permit the pressing jaw 25 to enter between the vamp and the lining and press the seam. To prevent the vamp from being caught in between the jaws, the pressing jaw 25 is provided with a horizontal bore 28 in the front end of which is secured a cylindrical plug 29 bearing upon its front face a flat guard plate 30. The anvil jaw is also provided with a longitudinal bore 31 (Fig. 6) in the front end of which is secured a cylindrical plug 32 bearing upon its front face a curved plate 33. The plates 30 and 33 assist the operative in the insertion of the lining between the jaws.

Figure 4:
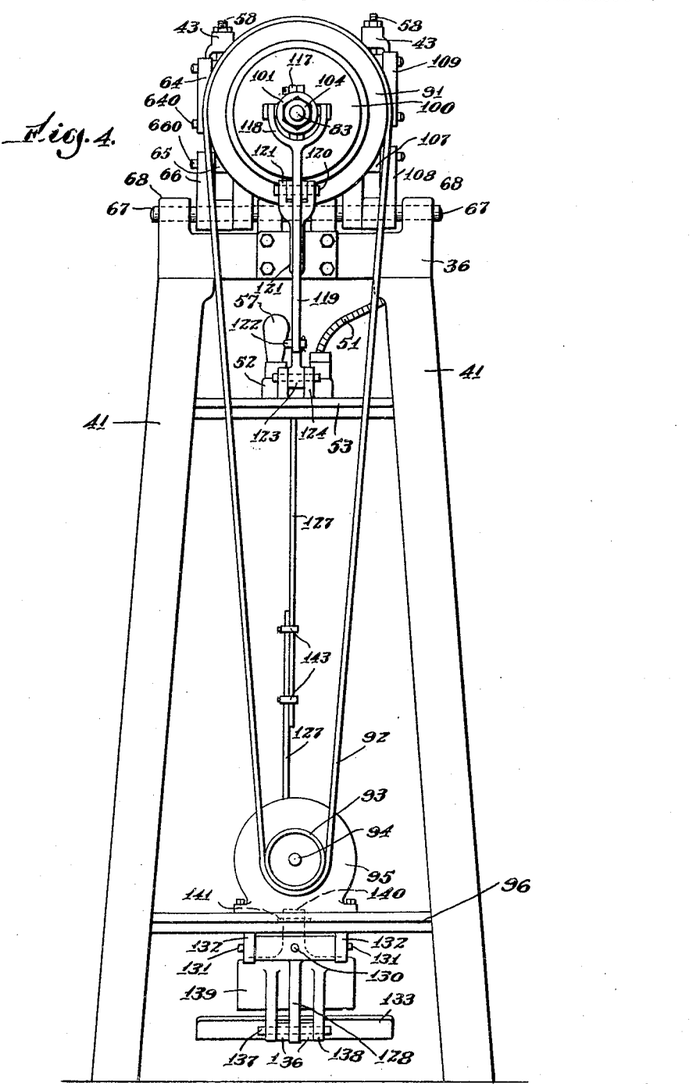
Fig. 4 is a view in rear elevation.
Figure 5:
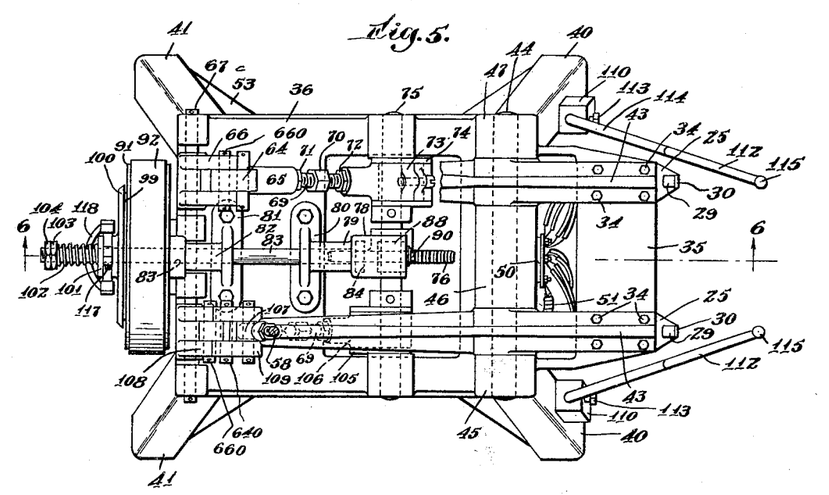
Fig. 5 is a view in plan.

The anvil jaws 24 are secured by bolts 34 to a flat surface extending across the front end of the machine (Fig. 2) and formed on a shelf 35 (Figs. 1 and 6) projecting upwardly and forwardly from a bed 36. The shelf 35 is strengthened by a stiffening rib 37 (Fig. 2), the construction being such that recesses are provided on the opposite sides of the rib 37 to render the bolts 34 accessible. The bed 36 is provided with front and rear horizontal cross ledges 38 and 39, which are bolted, respectively, to a pair of front legs 40 (Fig. 1) and to a pair of rear legs 41 (Fig. 4). The legs support the bed 36 in an elevated position from the factory floor at a convenient height therefrom so that the operative may stand at the front of the machine and insert the linings between the jaws.

Figure 6:
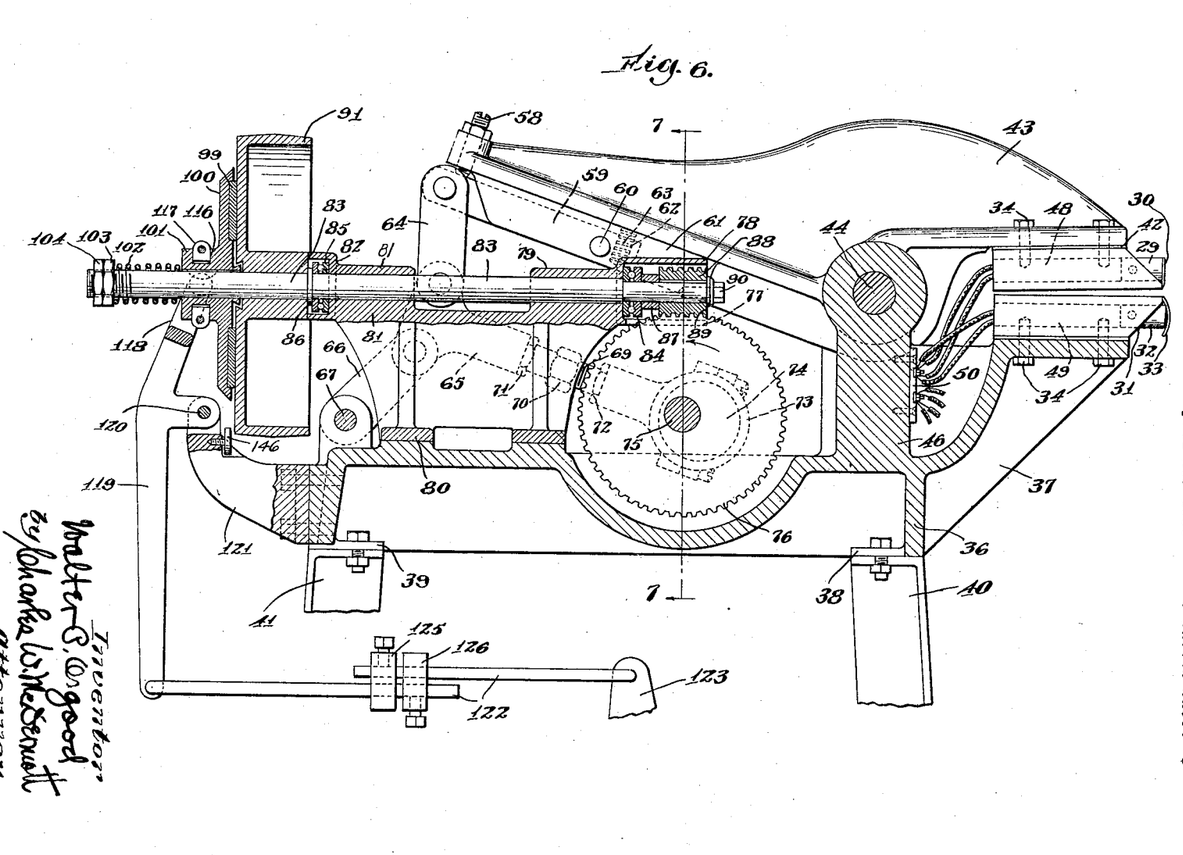
Fig. 6 (sheet 5) is a view in sectional elevation on the line 6—6, Fig. 5.
Figure 7:
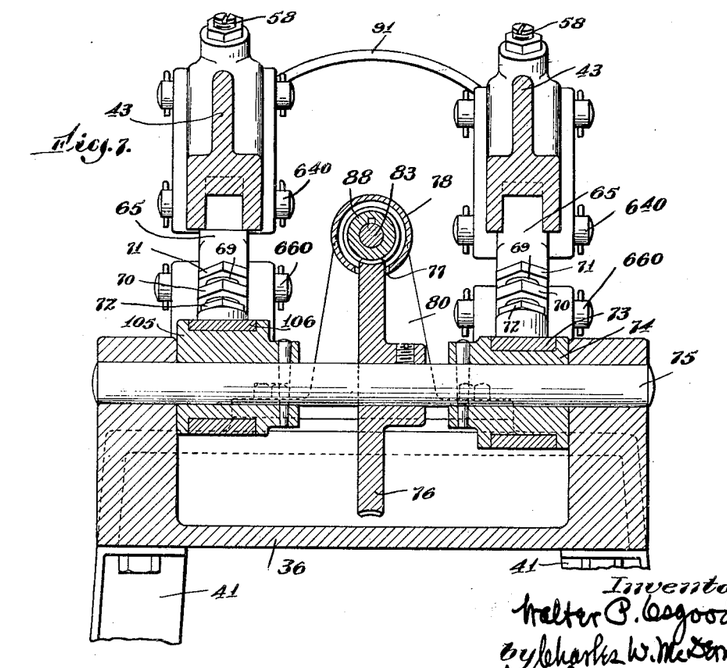
Fig. 7 (sheet 4) is a view in sectional elevation on the line 7—7, Fig. 6.

Each of the pressing jaws 25 is bolted to a flat bottom 42 (Fig. 6) formed on the front end of a swinging head 43. Each head 43 is pivoted on a stiff horizontal rod 44 supported by three sections 45, 46 and 47 (Fig. 2) of a vertical wall on the bed 36. The left hand head 43, viewing Fig. 1, swings on the rod 44 between the wall sections 45 and 46 while the right hand head 43 swings on the rod 44 between the wall sections 46 and 47. As shown in Fig. 6 the axis of the rod 44 lies in the horizontal plane of the face 27 on the pressing jaw 25 in its position of pressure so that the seam 23 is flattened throughout its extent at a single stroke of the pressing jaw 25. Thus, the entire length of the seam is pressed coincidentally.

Figures 2, 3:
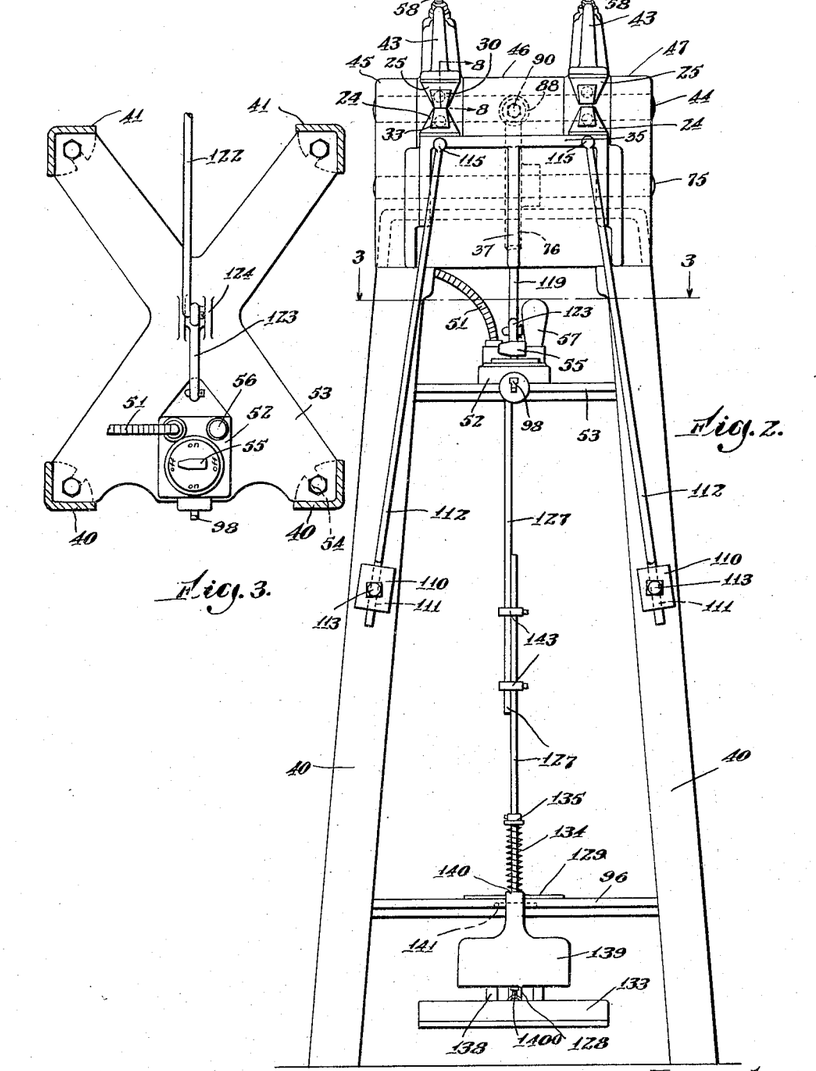
Fig. 2 is a view in front elevation.
Fig. 3 is a detail view in sectional plan on the line 3—3, Fig. 2.

In order to heat the jaws the bores 28 and 31 therein receive, respectively, heating cartridge coils 48 and 49 (Fig. 6). The electrical connections for the cartridge coils comprise eight wires, two for each cartridge. The eight wires for the cartridge are connected to a distributor 50 mounted on the wall section 46 in back of the shelf 35. The distributor 50 is electrically connected through wires in a cable 51 (Fig. 2) to a switch-box 52 mounted on a shelf 53 (Fig. 3). The shelf 53 is provided with four cross arms which are bolted to corner brackets 54 on the legs 40 and 41. The current for the cartridge coils is turned on and off through a button 55 which also acts as a pointer to indicate its on or off position. The switch-box 52 carries a socket 56 (Fig. 3) for an electric lamp 57 (Figs. 2 and 4), colored red, connected by a shunt circuit to the electrical connections for the cartridge coils so that when the heat is turned on the lamp 57 is lit and when the heat is turned off the lamp is extinguished.

By heating both the anvil jaw 24 and the pressing jaw 25 and by swinging the head 43 to bring the jaw 25 into engagement with the seam 23 supported by the anvil jaw 24 the seam 23 is subjected to heat and a heavy pressure.

During the manufacture of textile fabric of the kind used for shoe lining and the like, usually cotton duck, the constituent yarns are treated with sizing material such, for instance, as starch, and during the finishing operation the fabric sheet is also dressed with starch or other sizing to make it firm and smooth. Prior to dinking the parts of the lining out of the sheet of cotton duck, it is usually subjected to a mulling operation, that is, to a moist atmosphere for a certain period until it has absorbed a considerable quantity of moisture. Even though this mulling operation is omitted the fabric sheet for the lining always contains a certain percentage of moisture absorbed from the atmosphere. Preferably, however, the articulated toe linings are subjected to a mulling operation just before the seam reducing operation. When the seam 23 of the lining is subjected to combined heat and pressure the sizing apparently becomes adhesive to some extent due perhaps to the action of the included moisture. During the compression the overlapping plies of the lining are condensed so that their resulting aggregate thickness is not substantially greater than the thickness of a single ply, the straight edge on one part apparently tending to feather out until it merges smoothly and without appreciable shoulder into the feather at the straight edge on the other part. When the pressure is removed it is found that the cementitious sizing material has hardened or set, perhaps through the dehydrating action of the heat, giving a slightly glossy appearance to the joint and apparently acting to cement the plys together so that when the lining is subsequenly applied to the shoe, the extreme feather edges of the plies do not tend to separate but remain indefinitely in firm and snug union with the opposite ply. Stated in another way, the articulated lining parts are consolidated by the combined action of heat and pressure into an integer having substantially a uniform thickness through its extent.

In dealing with textile fabric of the kind usually employed for linings it is found that the starch or other sizing in the material is apparently sufficient to secure the desired results but adhesive may be applied to the pieces forming the lining before uniting them so that if suitable adhesive is employed, for example, adhesive derived from nitrocellulose, the stitching may be omitted entirely.

In order to swing the heads 43 each of them is provided with an adjusting screw 58 (Figs. 2, 4, 6 and 7) the bottom of which engages an end face on a lever 59 near the rear end thereof. Near its front end the lever 59 is pivoted on a horizontal pin 60 (Fig. 6) carried by the yoked side walls 61, of the rear end of the head 43, which house the lever 59. Between its front end and the pin 60 the lever 59 is provided with a chamber 62. A coiled spring 63 is interposed between the bottom of the chamber 62 and the bottom of the rear end on the head 43.

In the illustrated embodiment of the invention the heads 43 are swung forwardly and backwardly by an actuating mechanism operating automatically and continuously to bring one pair of anvil and pressing jaws into a position of clearance and to bring the other pair of anvil and pressing jaws into a position of pressure. The heads 43 are held stationary when the jaws are brought into their positions of pressure and clearance. During the position of clearance the operative inserts the lining of a made shoe upper between the separated jaws. During the position of pressure the ridge seam 23 is flattened and the overlapped parts in the seam are consolidated into an integer, substantially uniform in thickness throughout its extent, by the combined action of heat and heavy pressure. Tests demonstrate that the illustrated embodiment of the present invention increases the tensile strength of the seam articulating the toe lining parts.

In order to swing that head 43, which is shown in its position of clearance, (Figs. 2 and 6), the lever 59 is pivoted to one end of a link 64 (Fig. 6). The other end of the link 64 is pivoted at 640 to the rear end of an arm 65 at one side of its center line. On the other side of its center line the arm 65 is pivoted at 660 to one end of a link 66. The other end of the link 66 is pivoted on a horizontal rod 67 supported by four bosses 68 (Fig. 4) on the bed 36.

The arm 65 is made in two parts each of which is connected to a spindle 69 threaded into the adjacent ends of the arm 65. The spindle 69 is provided with a wrench-engaging surface 70 so that the spindle 69 may be rotated to either draw the adjacent ends of the arm 65 towards each other or move them apart and thus vary the length of the arm 65. The desired adjustment is maintained by locking nuts 71 and 72.

The front end of the arm 65 is provided with a strap 73 (Figs. 6 and 7) which embraces the periphery of an eccentric 74. The eccentric 74 is keyed to a horizontal cross shaft 75 journaled in bearings formed in the bed 36. Secured centrally on the shaft 75 is a worm-wheel 76 which works in a slot 77 (Fig. 7) formed in a housing 78 integral with a bearing 79 (Fig. 6). The bearing 79 is formed on a bracket 80 secured by four bolts to the bed 36. The bracket 80 carries a second bearing 81 (Fig. 6) having an integral housing 82. Journaled in the bearings 79 and 81 is a shaft 83.

The shaft 83 is held from movement longitudinally in the bearings 79 and 81 by a thrust bearing 84 mounted on a reduced diameter portion of the shaft 83 at the front end thereof, and a thrust bearing 85 mounted on the shaft 83 within the housing 82. The thrust bearing 85 is held in engagement with the bearing 81 by a shoulder 86 formed on the shaft 83. The thrust bearing 84 is held in engagement with the bearing 79 by a spacing collar 87 which is engaged in turn by a worm 88 splined on the shaft 83 and held thereon by a washer 89 backed by a bolt 90 threaded into the front end of the shaft 83. The worm 88 meshes with and drives the worm-wheel 76.

In order to rotate the shaft 83 it carries, adjacent the shoulder 86, a loose pulley 91 which is rotated by a belt 92 (Figs. 1 and 4) which passes around the pulley 91 and a smaller pulley 93 secured to the armature shaft 94 of an electric motor 95. The base of the motor 95 is bolted to a shelf 96 bolted, like the shelf 53, to the legs 40 and 41. The electrical connections for the electric motor are led by a cable 97 (Fig. 1) to the box 52 on the shelf 53 so that the motor may be started and stopped by manipulation of a snap-switch 98 (Fig. 2) carried by the box 52.

In order to clutch the pulley 91 to the shaft 83, its rear face is engaged by a friction ring 99 (Fig. 6) secured to one face of a disk 100 the hub 101 of which is splined on the rear end of the shaft 83. The disk 100 is pressed normally in a direction to engage the ring 99 with the rear face of the pulley 91 by a spring 102 coiled about the rear end of the shaft 83 and interposed between the hub 101 and suitable spring tension adjusting and locking nuts 103 and 104 threaded on the rear end of the shaft 83.

With this construction manipulation of the snap-switch 98 starts the electric motor 95 to drive the belt 92 and rotate the pulley 91 which is clutched to the shaft 83 by means of the friction disk 100. Rotation of the shaft 83 drives the worm-wheel 76 through the worm 88 meshed therewith. The worm-wheel 76 rotates the shaft 75 which in turn rotates the eccentric 74.

Figure 12:
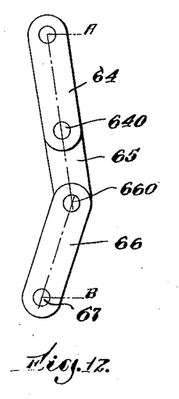
Figs. 12, 13, 14 and 15 are diagrammatic views showing how the toggle, which is continuously driven, holds the pressing members stationary in the position of pressure for a protracted period.
Figure 13:
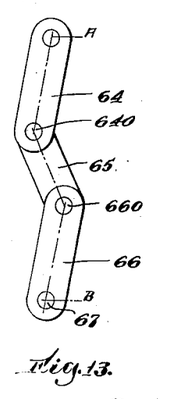
Figure 14:
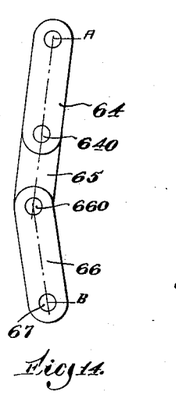
Figure 15:
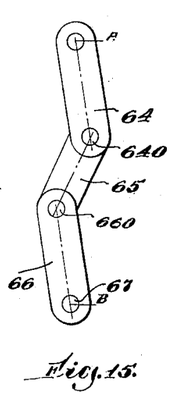

Referring to Fig. 6 it is apparent that the links 64 and 66 constitute, with the rear end of the rod 65, a toggle. When the eccentric 74 is rotated the links of the toggle are straightened to swing the head 43 downwardly and thus bring the jaw 25 into its position of pressure. By providing a toggle having the independent adjacent pivots 640 and 660, instead of a common pivot, the toggle may be designed so that when the links thereof are straightened into the position of Fig. 12 the jaw 25 is in its position of pressure. Further straightening of the toggle links does not move the jaw 25 because the link of the toggle formed by the rear end of the arm 65 is oscillated by the eccentric 74 first in one direction (Fig. 13) and then in the other (Fig. 15) to maintain the distance between the points A and B substantially uniform during the movement of the toggle from the position of Fig. 12 through the intermediate position of Fig. 13, to the extreme position of Fig. 14, and back through the intermediate position of Fig. 15 to the position of Fig. 12. During the movements of the pivots 640 and 660 to the left (Figs. 12, 13 and 14) the pivot 640 moves across the line A—B ahead of the pivot 660 in travelling from the position of Fig. 12 to that of Fig. 14. The pivot 640 also moves across the line A—B ahead of the pivot 660 in travelling from the position of Fig. 14 back to that of Fig. 12. The practical result of this is to maintain the line A—B substantially constant in length during the movement of the toggle from the position of Fig. 12 to that of Fig. 14 and back to the position of Fig. 12.

With this construction the jaw 25 is brought into a position of pressure by a toggle which, notwithstanding the continued rotation of the eccentric 74, holds the jaw in its pressure position for a protracted period. Stated in another way, the jaw 25 is held in a position of pressure through an extensive arc measured on the circle described by a point on the periphery of the eccentric during its rotation.

In order that the heads 43 may be swung in opposite directions to bring the two sets of jaws into positions of pressure and clearance alternately, the shaft 75 carries a second eccentric 105 (Fig. 7) keyed thereto. This eccentric is arranged on the shaft 75 with its low side directed in the same direction as the high side on the eccentric 74. The eccentric 105 is embraced by a strap 106 connected to a longitudinally adjustable arm 107 (Fig. 1) which is a duplicate of the arm 65. The arm 107 at one side of its center line is pivoted to one end of a link 108 the other end of which is pivoted on the rod 67. On the other side of its center line the arm 107 is pivoted to one end of a link 109 the other end of which is pivoted to the lever 59 for the left hand head 43, viewing Fig. 1. This head is swung downwardly and upwardly to bring the jaw 25 into its position of pressure and clearance, respectively, and is held stationary to maintain the jaw 25 in its positions of pressure and clearance for protracted periods in the same manner heretofore referred to in describing the construction and mode of operation of its twin head.

The heads 43 are swung downwardly positively through the engagement of the lever 59 with the screws 58. By adjusting the position of the screw 58 relatively to the heads 43 the position of the jaws 25 in their position of pressure may be varied to accommodate them to work of different thicknesses. After the jaws 25 have flattened out the seams 23 there is a tendency for the faces 27 to stick thereon. It is desirable therefore that the jaws 25 be retracted yieldingly. This desirable result is obtained through the springs 63 which permit the heads 43 and the levers 59 to move relatively until the springs 63 are compressed whereupon the heads 43 and the levers 59 move as units.

In order that the operative may be relieved from the duty of withdrawing the finished work from the machine, each of the front legs 40 is provided with a block 110 having a cylindrical opening 111 therein which receives one end of a bent rod 112 secured to the block by a bolt 113. The upper end of the rod 112 normally extends to a point in front of and slightly below the anvil jaw 24. With this construction the operative may insert the free end of the rod 112 through a made upper and then by engaging the closed end of the made upper (Fig. 1) place the rod under tension as the lining of the made upper is inserted between the separated jaws 24 and 25. The operative holds the rod 112 under tension until the pressing jaw 25 engages the lining for the pressing operation. Immediately upon the completion of the pressing operation the rod 112 springs back to its normal position thus snatching the made upper from between the jaws. The released upper drops down the rod to a horizontally bent portion 114 where it nests with other withdrawn uppers in a stack. To prevent the upper slipping off the free end of the tensioned rod 112 it is provided with a bulbous head 115.

By adjusting the lengths of the arms 65 and 107 the relative times in which the jaws 24 and 25 are held in their positions of pressure and clearance may be varied. Lengthening the arms 65 and 107 shortens the time in which the jaws are held in a position of clearance and lengthens the time in which the jaws are held in a position of pressure. Shortening the arms 65 and 107 lengthens the clearance position time and shortens the pressure position time. With an expert or a fast operative the clearance position time may be short. With a tyro or a slow operative the clearance position time must be longer.

But whether the clearance position time is long or short it sometimes happens that the operative finds, in the pile of made uppers sent to him for the seam pressing operation, a lining which is puckered by the stitches along the seam 23. To position such a badly stitched seam flatwise on the anvil jaw 24 would take more time than the machine has been adjusted to allow during the position of clearance.

In order to suspend the operation of the machine to give the operative more time in which to insert an irregular lining between the jaws 24 and 25 the hub 101 (Figs. 1 and 6) is provided with a peripheral groove 116 loosely embraced by a strap 117. The strap 117 is pivotally connected to the yoked ends 118 of a lever 119 pivoted at 120 on a bracket 121 secured to the rear face of the bed 36. The lower end of the lever 119 is connected by a two part rod 122 to the vertical arm of a bell-crank lever 123 pivoted on a bracket 124 supported by the shelf 53. The two parts of the rod 122 are connected by hangers 125 and 126 so that the effective length of the rod 122 may be varied as desired. By permitting the adjustment of the length of the rod 122 the weight of the lever 119 may be balanced delicately so that it does not exert pressure on the strap 117 tending to move it in either direction in the groove 116.

The horizontal arm of the bell-crank lever 123 is connected to the upper end of a two-part rod 127 the lower end of which is connected to a treadle 128. Near its lower end the rod 127 passes loosely through a plate 129 which bridges an opening (not shown) in the shelf 96. The treadle 128, at its rear end, is secured by a set-screw 130 to a rock-shaft 131 mounted to rock in lugs 132 depending from the shelf 96. The front end of the treadle 128 is provided with a pedal 133. With this construction the operative may, at any time, step on the pedal 133 to withdraw the friction disk 100 from the pulley 91 and stop the machine. The machine is restarted when the operative releases the pedal 133 by a spring 134 coiled about the rod 127 and interposed between the plate 129 and a collar 135 on the rod 127.

In order to hold the machine stationary without requiring the operative to stand on the pedal 133 the treadle 128 carries intergral lugs 136 (Fig. 4) which support a horizontal pin 137. Pivoted on the pin 137 and engaged, respectively, by the lugs 136, are arms 138 depending from a lock 139. Normally the lock 139 is supported out of locking position on the head of a bolt 1400 adjustably mounted on the treadle 128. After the pedal 133 is depressed by the operative, who rests his heel on the pedal 133 with the sole of his shoe engaged with the front face of the lock 139, the treadle rod 127 may be depressed and the lock 139 kicked backwardly to engage a point 140 thereon beneath a ledge 141 formed in the shelf 96. Normally the point 140 extends through an opening 142 in the shelf. In order to adjust the rod 127 so that the point 140 will come under the ledge 141 when the treadle is depressed the two parts of the rod 127 engage and slide through clamps 143 so that the effective length of the rod 127 may be varied as desired. The front face of the treadle 128 and the back face of the lock 139 are provided with lugs 144 and 145 to stop the rearward movement of the lock 139.

With this construction the operative may by a slight movement of the pedal unclutch the pulley 91 from the shaft 83 to suspend, in an emergency, the operation of seam pressing. To prevent the pulley 91 from following the friction disk 100 when it is moved to the left (Fig. 6) the bracket 121 (Fig. 1 and 6) carries an adjustable button 146 arranged to engage the pulley 91 and separate it from the disk 100. The operative may kick back the lock 139 and thus lock the pedal 133 in its depressed position. The pedal and lock may be released by a slight pressure on the pedal 133 as the released lock 139 drops back under the influence of a spring interposed between the lugs 144 and 145 into engagement with the bolt 1400.

Figure 1:
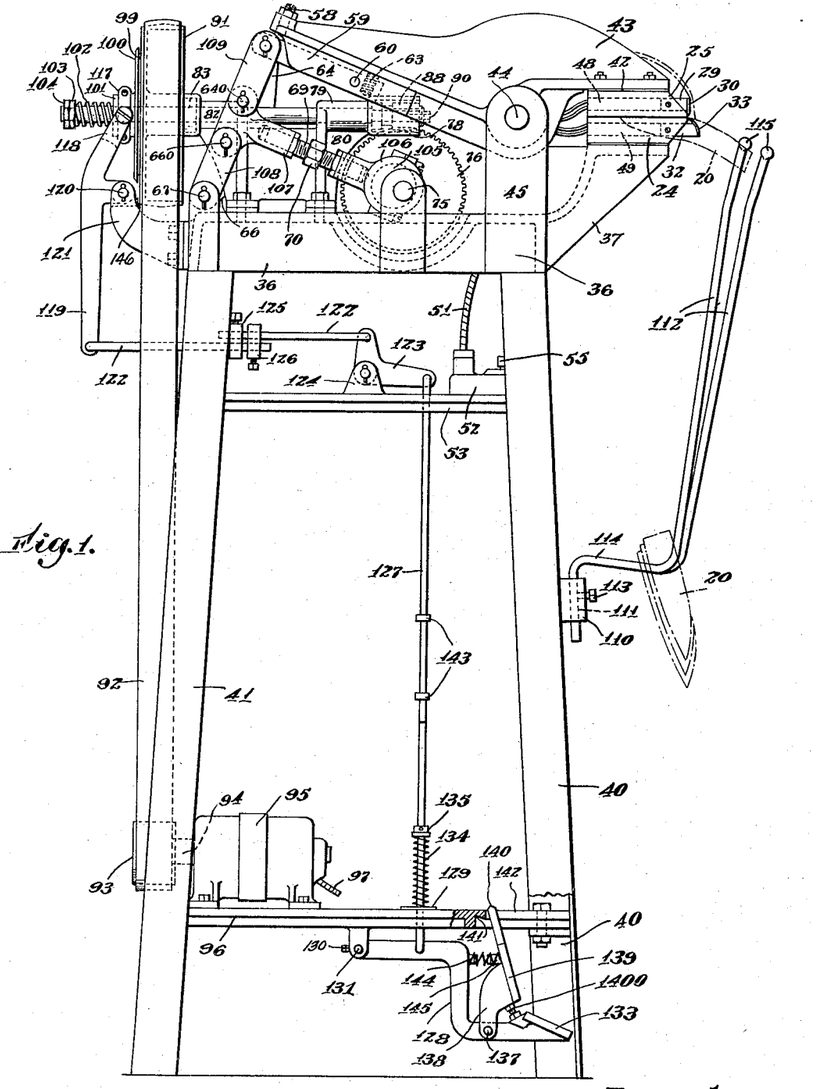
Figure 1 is a view in left side elevation of a machine for pressing at a single stroke the longitudinal seam of the lining of a made shoe upper.

From an inspection of Fig. 2 it is apparent that the movement of the jaws 25 into and out of a position of pressure is very short. In fact, in pressing the lining seam of a made shoe upper the clearance between the jaws 24 and 25 at their front ends may be $\frac{3}{16}$ of an inch. This clearance is just enough to permit the operative to slip the lining between the jaws each time they open. By adjusting the arms 65 and 107 the toggles may operate as shown in Figs. 1 and 6 instead of in the manner illustrated in Figs. 12 to 15, which, however, show the preferred mode of operation in order that the jaws 25 may dwell in their positions of pressure and/or clearance.

Nothing herein explained is to be interpreted as limiting the various features of the present invention in the scope of its application to use in connection with the particular machine or the particular mode of operation or both selected for purposes of illustration and explanation. While the particulars of construction herein set forth are well suited to one mechanical form of the invention and to the use to which it is put, it is not limited to this use, nor to these details of construction, nor to the conjoint use of all its features, nor is it to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new, is:

1. In a seam reducing machine, the combination with a jaw for directly supporting similar articulated parts of a shoe upper in different planes, respectively, and a cooperating jaw acting directly on the opposite side of said articulated parts, of automatic means for closing said jaws with heavy pressure to cause said articulated parts to be consolidated into a single plane.

2. In a seam reducing machine, the combination with a jaw for directly supporting similar parts of a shoe upper, articulated by a lap seam, a cooperating jaw acting directly on the opposite side of said articulated parts, and means for heating at least one of said jaws, of automatic means for closing said jaws with heavy pressure to cause said articulated parts to be consolidated into a single plane.

3. In a seam reducing machine, the combination with a jaw for supporting the pieces of a pieced lining articulated by a longitudinal seam, and a cooperating jaw acting directly on the opposite side of the lining, of automatic means for closing said jaws with heavy pressure to cause said pieces to be consolidated at the seam into a single plane.

4. In a seam reducing machine, the combination with a jaw for supporting the pieces of a pieced lining of a made shoe upper in different planes, respectively, and a cooperating jaw acting directly on the opposite side of the lining, of automatic means for closing said jaws with heavy pressure to cause said pieces to be consolidated into a single plane.

5. In a seam pressing machine, the combination with a work supporting member constructed to support a two-piece lining in a made shoe upper with one piece flat and the other piece overlapping the flat piece adjacent the longitudinal seam thereof, a pressing member constructed to extend between the supported lining and the vamp, of automatic means for operating the presser member to press both pieces into the same flat condition.

6. In a machine for operating upon made shoe uppers, the combination with means for operating upon a made shoe upper, of means engaged with the made shoe upper during the operation of the first named means for ejecting the made shoe upper from the machine.

7. In a machine for operating upon made shoe uppers, the combination with means for operating upon a made shoe upper and means for ejecting the made shoe upper from the machine, of means for stacking the ejected made uppers.

8. In a machine for operating upon made shoe uppers, the combination with an anvil jaw constructed to support the lining of a made shoe upper and means engaging the made shoe upper for exerting tension thereon tending to withdraw it from the anvil jaw, of a pressing jaw movable to hold the lining on the anvil jaw against the tension of said means.

9. In a machine for operating upon a made shoe upper, the combination with an anvil jaw constructed to support the lining of a made shoe upper and means engaged with the closed end of the made shoe upper for exerting tension thereon tending to withdraw it from the anvil jaw, of a pressing jaw movable in one direction to hold the lining on the anvil jaw against the tension of said means and movable in another direction to release the made upper to permit said means to withdraw the made upper from between the jaws.

10. In a machine for operating upon made shoe uppers, the combination with cooperating members constructed to hold a made shoe upper between them, of a flexible rod engaged with the made upper and tensioned by the act of inserting the made shoe upper between the cooperating members.

11. In a machine for operating upon made shoe uppers, the combination with cooperating members constructed to hold a made shoe upper between them, of a flexible rod engaged with the made upper and tensioned by the act of inserting the made shoe upper between the cooperating members, said rod operating to withdraw the made upper from between the cooperating members immediately upon its release thereby.

12. In a machine for operating upon made shoe uppers, the combination with cooperating members constructed to hold a made shoe upper between them, of a flexible rod engaged with the made upper and tensioned by the act of inserting the made shoe upper between the cooperating members and said rod constructed to stack the withdrawn made uppers.

13. A seam pressing machine having, in combination, an anvil jaw, a pressing jaw and mechanism having a permanently operative connection with one of said jaws acting automatically and continuously to bring the jaws into a position of direct pressure, to hold them in such position and thereafter to separate them, and means for varying the time during which the jaws are held in the position of pressure.

14. A seam pressing machine having, in combination, an anvil jaw, a pressing jaw, mechanism having a permanently operative connection with one of said jaws acting automatically and continuously to bring the jaws into a position of direct pressure, to hold them in such position, to thereafter separate them, and to hold them separated, and means for varying the time during which the jaws are held separated.

15. A seam pressing machine having, in combination, an anvil jaw, a pressing jaw, mechanism having a permanently operative connection with one of said jaws acting automatically and continuously to bring the jaws into a position of direct pressure, to hold them in such position, to thereafter separate them and return them into a position of clearance, and means for varying the time during which the jaws are held both in the position of pressure and the position of clearance.

16. A seam pressing machine having, in combination, an anvil jaw, a pressing jaw, mechanism operating automatically and continuously to impart a relative movement to the jaws to bring them into a position of pressure, to hold them in said position during the time required to press the seam and thereafter to separate the jaws to return them to a position of clearance, and means for snatching the pressed seam from between the jaws immediately upon their separation.

17. A seam pressing machine having, in combination, an anvil jaw, a pressing jaw, mechanism operating automatically and continuously to impart a relative movement to the jaws to bring them into a position of pressure, to hold them in said position during the time required to press the seam and thereafter to separate the jaws to return them to a position of clearance, and to hold them separated in the position of clearance during the time required to insert another seam between the jaws and set the snatching means, and means for snatching the pressed seam from between the jaws immediately upon their separation.

18. A shoe machine having, in combination, a work support, a pressing form, and mechanism operating automatically and continuously to impart a relative movement to the support and form to bring them alternately into a position of pressure and a position of clearance, including a continuously rotating eccentric, an eccentric strap and arm connection therefor, a link having one end pivoted to the frame of the machine and the other end pivoted to the arm at one side of its center line, and a second link having one end pivoted to the arm at the other side of its center line, the other end having a pivot movable during the relative movement of the working support and pressing form.

19. A shoe machine having, in combination, a work support, a pressing form, and mechanism operating automatically to impart a relative movement to the support and form to bring them alternately into a position of pressure and a position of clearance including a toggle, the links of which have independent pivots.

20. A shoe machine having, in combination, a work support, a pressing form, and mechanism operating automatically to impart a relative movement to the support and form to bring them alternately into a position of pressure and a position of clearance including a toggle having two links connected by a third link and means for moving the third link bodily.

21. A shoe machine having, in combination, a work support, a pressing form, and mechanism operating automatically to impart a relative movement to the support and form to bring them alternately into a position of pressure and a position of clearance including a toggle having two links connected by a third link and means for oscillating the third link.

22. A shoe machine having, in combination, a work support, a pressing form, and mechanism operating automatically to impart a relative movement to the support and form to bring them alternately into a position of pressure and a position of clearance including a toggle having two links connected by a third link and an eccentric for oscillating the third link.

23. In a machine for operating upon made shoe uppers prior to the assembling operation, the combination with means for operating upon a made shoe upper, of means for ejecting the made shoe upper from the machine.

24. In a machine for operating upon made shoe uppers, the combination with means for operating on a made shoe upper, of means engaging the inside of the made shoe upper for ejecting it from the machine.

25. In a seam reducing machine, the combination with means for supporting a pieced toe lining joined together by at least one seam forming an overlap, of automatic means for reducing the seam at the overlap to the thickness substantially of one of the toe lining pieces.

In testimony whereof I have signed my name to this specification.

WALTER P. OSGOOD.